Patented Oct. 5, 1954

2,690,972

UNITED STATES PATENT OFFICE 2,690,972

FOOD PRODUCTS CONTAINING HONEY AND METHOD OF MANUFACTURING THEM

Douglas B. Bradshaw, Wendell, Idaho

No Drawing. Application May 28, 1951,
Serial No. 228,760

9 Claims. (Cl. 99—146)

This invention relates to food products and is more particularly concerned with fruit products useful as a spread in the manner of jellies, jams, preserves and the like.

This invention also relates to and one of the objects thereof is the provision of a fruit product of the type mentioned which has a smooth, creamy texture and a rich natural full fruit taste.

Another object of the invention is the provision of such a product which contains a substantial portion of honey, but in which the fruit flavor and taste dominates or completely overcomes the honey flavor and taste so as not to be objectionable to persons who dislike honey as a food product.

A further object is the provision of a method of preparing such products in a simple and inexpensive manner.

A still further object is the provision of such a product and a method of manufacturing it which does not contain moisture in adulterating quantities or in excess of the limits imposed by law.

These and other objects and advantages of the invention will appear more fully from the following description.

Many attempts have heretofore been made to provide new food products from honey. Honey itself has an exquisite sweetness of which some persons are fond, but which is objectionable to other persons. As a result, honey, as such, has not generally enjoyed a wide acceptance by the public. Its extreme stickiness has also been a factor discouraging its use on a large scale by persons in preference to ordinary jams, jellies, preserves and similar fruit spreads.

I have found it possible to eliminate both of the above objections by the present invention. Although previous attempts have been made to accomplish a similar result, they have not been successful and required the addition of substantial amounts of water to yield a product having a moisture content in adulterating quantities or beyond the legal limits permitted.

The present invention broadly comprises the extraction of moisture from ordinary liquid honey, such as by evaporation under vacuum, and then blending it with a concentrated fruit juice, such as orange, raspberry, grape, loganberry, etc. or mixtures of any two or more. In the resulting blend, there is then uniformly dispersed a specially prepared fondant of fine honey crystals. This dispersion is then packaged and maintained at a temperature favoring the crystallization of dextrose in the blend.

The evaporation of the initial honey is preferably carried out under such conditions as to avoid darkening or other decolorization of the honey and to avoid also any substantial loss in flavor. Satisfactory results have been obtained by boiling out the moisture under about 14 to 26 inches of vacuum for about 15 to 45 minutes, the best results thus far obtained being under about 26 inches of vacuum for about 30 minutes.

The moisture content is reduced to the point where upon blending with the fruit juice concentrate the resulting mixture will not contain more than the required or permitted percentage of moisture which, under ordinary circumstances, is between about 17 and 19%. Using a 3 to 1 fruit concentrate, that is, one which is reconstituted by the addition of 3 parts water to 1 part of concentrate, a reduction to about 14% moisture content is usually satisfactory.

At the conclusion of the evaporation step, the resulting concentrated honey, in the hot state, is promptly removed to a mixing tank and blended with the fruit concentrate, preferably a 3 to 1 concentrate. The proportions of concentrated honey to concentrated fruit juice will vary, depending upon the particular fruit concentrate being used, but will usually be in the range of about 4 to 10 parts concentrated honey to 1 part of concentrated fruit juice.

In the case of orange juice concentrates, for example, a ratio of 7 to 1 is preferred. In the case of concentrated grape juice, a ratio of 5 to 1 is preferred and in the case of raspberry and loganberry, a ratio of 6 to 1 is preferred. In the case of orange juice also, a fractional percent of citric acid (less than $\frac{1}{10}$ of 1%) is added for flavor emphasis, if the concentrate does not already contain citric acid or an equivalent agent.

The moisture content of the resulting blend is then tested and, if necessary, sterilized water is added to bring it up to the desired point.

The blend is quickly made and quickly cooled to minimize loss of volatile aromatic flavoring essence. In this step the temperature should be brought down below the melting point of dextrose crystals, but sufficiently high to be workable for the dispersion of the fondant in the next step. Suitable temperatures are in the range of about 80° to 95° F., a preferred temperature being about 85° F.

The honey fondant is specially prepared to provide two important characteristics, namely, (1) to furnish seed crystals and (2) to develop proper consistency. Honey seed crystals are prepared in a well known manner from ordinary liquid honey to provide minute crystalline particles. These crystals are much smaller than those obtained under ordinary conditions of crystallization, but they are coherent and, as customarily used, are not fully separated from each other. A mass of such crystals is usually broken up in a rather crude manner, resulting in crystal clusters, rather than in discreet separate crystals. The crystals are actually those of dextrose suspended in the liquid levulose phase of the honey. Honey consists principally of dextrose and levulose. The dextrose crystallizes, but the levulose does not, acting as a carrier for the dextrose crystals. When the individual dextrose crystals are separated from each other in the levulose carrier, they present a greater surface area than the same amount of cystals in the form of clusters and, therefore, promote more rapid crystallization of liquid dextrose with which it may be mixed. Moreover, I have found that if the dextrose of the fondant is fully crystallized and the crystals are in a separated form in the levulose carrier, the viscosity is much lower than in the case of honey containing only partially crystallized dextrose or in which the crystals are not substantially all separated.

An effective method of separating the individual crystals of clusters is by subjecting the clusters to a combined beating and hammering action for which purpose various commercial apparatus are available. This produces a fondant material, differing from ordinary crystallized honey.

Since the viscosity of the fondant is less than that of the fruit-honey concentrate blend, the consistency of the final product can be controlled by adjusting the amount of fondant added. The amount is usually kept in the range of about 10 to 20% for economy purposes, but additional amounts may be added, if desired to provide the consistency or degree of hardness desired. The fondant is uniformly dispersed in the fruit-honey concentrate blend, preferably without air entrapment to avoid air bubbles in the packaged product.

The composition is then ready to be packaged in containers. In the containers, crystallization of the dextrose proceeds, if the temperature is maintained below the melting point of the dextrose.

The resulting product is a delicate, smooth textured composition that can be spread like butter and has the rich, natural flavor and taste of the fresh fruit.

Although this invention has been described by the use of fruit concentrates, it is apparent that other flavoring materials may be used, such as maple, apple, etc. Also suspensions of powdered products, such as cinnamon, ginger, cocoa and similar materials as well as purees may be used in conjunction with or in substitution of the fruit concentrates.

It is also to be understood that the customary food colorings and flavorings may be added, if desired, to improve the appearance and flavor of the final product.

Having thus described my invention, I claim:

1. A food product comprising a mixture of separately concentrated honey and separately concentrated fruit juice in a crystallized form, the relative concentrations and proportions of the honey and fruit juice being such that the resulting food product has a moisture content and consistency substantially the same as crystallized natural honey and in which the flavor of the fruit juice dominates the flavor of the honey.

2. A food product comprising a solid mixture of separately concentrated honey in which the dextrose is crystallized and separately concentrated fruit juice in the proportion of 4 to 10 parts concentrated honey to 1 part fruit juice, the relative concentrations of the honey and fruit juice being such that the resulting food product has a moisture content substantially the same as crystallized natural honey and the fruit juice flavor dominates the flavor of the honey.

3. A food product comprising a mixture of separately concentrated honey and separately concentrated fruit juice containing a dispersion of a honey fondant of separated discreet dextrose crystals, the relative concentrations and proportions of the honey and fruit juice being such that the resulting food product has a moisture content and consistency substantially the same as crystallized natural honey and the flavor of the fruit juice dominates the flavor of the honey.

4. The method of manufacturing a food product consisting essentially of concentrating natural substantially pure honey by evaporation of moisture therein, mixing the concentrated honey with a concentrated natural substantially pure fruit juice, dispersing therein a honey fondant containing discreet, separated dextrose crystals as seed for the dextrose of the concentrated honey and permitting the dextrose of the concentrated honey to crystallize, the relative concentrations and proportions of the honey and fruit juice being such that the resulting food product has a moisture content and consistency substantially the same as crystallized natural honey and the flavor of the fruit juice dominates the flavor of the honey.

5. The method of manufacturing a food product as defined by claim 4 in which the viscosity of the honey fondant is less than that of the mixture of honey concentrate and fruit juice concentrate so as to reduce the hardness of the final product.

6. The method of manufacturing a food product as defined by claim 4 in which 4 to 10 parts of the honey concentrate is used to 1 part of the fruit juice concentrate.

7. The method of manufacturing a food product as defined by claim 4 in which 10 to 20% of the fondant is used.

8. The method as defined by claim 4 in which the mixing is effected at a temperature below the melting point of crystalline dextrose.

9. The method as defined by claim 4 in which the mixing is effected at a temperature in the range of about 80° to 95° F.

References Cited in the file of this patent

UNITED STATES PATENTS

| Number | Name | Date |
| --- | --- | --- |
| 1,854,430 | Stratton | Apr. 19, 1932 |
| 1,911,882 | Crane | May 30, 1933 |
| 1,987,893 | Dyce | Jan. 15, 1935 |
| 2,414,290 | Erickson | Jan. 14, 1947 |
| 2,573,750 | White, Jr. | Nov. 6, 1951 |

OTHER REFERENCES

"Honey and Its Uses in the Home," United States Dept. of Agriculture, Farmers' Bulletin 653, revised August 1922, Wash., D. C., page 25.